United States Patent
Yamahira et al.

(10) Patent No.: US 11,421,929 B2
(45) Date of Patent: Aug. 23, 2022

(54) FOOD MANAGEMENT SYSTEM

(71) Applicant: PANASONIC INTELLECTUAL PROPERTY MANAGEMENT CO., LTD., Osaka (JP)

(72) Inventors: Seiji Yamahira, Kyoto (JP); Yuta Moriura, Osaka (JP); Akihiro Odagawa, Osaka (JP); Kazuya Niki, Osaka (JP); Shinobu Masuda, Osaka (JP); Yui Sawada, Osaka (JP); Keiji Noine, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 356 days.

(21) Appl. No.: 16/740,232

(22) Filed: Jan. 10, 2020

(65) Prior Publication Data
US 2020/0149797 A1  May 14, 2020

Related U.S. Application Data

(63) Continuation of application No. PCT/JP2018/026683, filed on Jul. 17, 2018.

(30) Foreign Application Priority Data

Jul. 21, 2017 (JP) .............................. JP2017-141484

(51) Int. Cl.
| | |
|---|---|
| *F25D 11/00* | (2006.01) |
| *G06N 20/00* | (2019.01) |
| *G06V 20/68* | (2022.01) |
| *G06V 20/00* | (2022.01) |

(52) U.S. Cl.
CPC ............. *F25D 11/00* (2013.01); *G06N 20/00* (2019.01); *G06V 20/00* (2022.01); *F25D 2400/36* (2013.01); *F25D 2700/06* (2013.01); *G06V 20/68* (2022.01)

(58) Field of Classification Search
CPC ...... F25D 11/00; F25D 2500/06; F25D 29/00; F25D 2700/06; G06Q 10/08; G06N 20/00
See application file for complete search history.

(56) References Cited

FOREIGN PATENT DOCUMENTS

| | | | |
|---|---|---|---|
| JP | 2001-317860 A | | 11/2001 |
| JP | 2003185327 A | * | 7/2003 |
| JP | 2006-329597 A | | 12/2006 |
| JP | 2014-085043 A | | 5/2014 |
| JP | 2017-015298 A | | 1/2017 |

OTHER PUBLICATIONS

International Search Report and Written Opinion dated Oct. 16, 2018 in International Application No. PCT/JP2018/026683; with partial English translation.

* cited by examiner

*Primary Examiner* — Lionel Nouketcha
(74) *Attorney, Agent, or Firm* — McDermott Will & Emery LLP

(57) ABSTRACT

A food management system that manages food items in a refrigerator includes: a pressure-sensitive sensor that acquires information including shapes, weights, and positions of the food items; a comparator that performs comparison of the information acquired at different times; and an identifier that identifies at least one of (i) fluctuations in the number of food items or (ii) presence or absence of the food items.

18 Claims, 13 Drawing Sheets

FIG. 4

| No | POSITION | SHAPE | WEIGHT | PLACEMENT PERIOD (COUNT ACCUMULATED VALUE Cnt_i) |
|---|---|---|---|---|
| 1 | Sen_8_10 | ○ | 50 | 0 |
| 2 | Sen_18_10 | ○ | 130 | 70 |
| 3 | Sen_7_5 |  | 200 | 25 |
| 4 | Sen_12_20 |  | 700 | 25 |
| ⋮ | ⋮ | ⋮ | ⋮ | ⋮ |

| EVENTS | COUNTER | PLACEMENT PERIOD (COUNT ACCUMULATED VALUE Cnt) | | | |
|---|---|---|---|---|---|
| | | FOOD A | FOOD B | FOOD C | FOOD D |
| INITIAL STATE | Tcnt = 0 | 0 | 0 | 0 | — |
| CLOSING OF DOOR | START | 0 | 0 | 0 | — |
| — | COUNT | 0 | 0 | 0 | — |
| OPENING OF DOOR | END TCNT = 10 | 0 | 0 | 0 | — |
| (DATA SAVING) | RESET TCNT = 0 | 10 | 10 | 10 | — |
| ADD FOOD D | Tcnt = 0 | 10 | 10 | 10 | 0 |
| CLOSING OF DOOR | START | 10 | 10 | 10 | 0 |
| — | COUNT | 10 | 10 | 10 | 0 |
| OPENING OF DOOR | END TCNT = 5 | 10 | 10 | 10 | 0 |
| (DATA SAVING) | RESET TCNT = 0 | 15 | 15 | 15 | 5 | ns
FOOD MANAGEMENT SYSTEM

CROSS REFERENCE TO RELATED APPLICATIONS

This application is a U.S. continuation application of PCT International Patent Application Number PCT/JP2018/026683 filed on Jul. 17, 2018, claiming the benefit of priority of Japanese Patent Application Number 2017-141484 filed on Jul. 21, 2017, the entire contents of which are hereby incorporated by reference.

BACKGROUND

1. Technical Field

The present disclosure relates to a food management system.

2. Description of the Related Art

Conventionally, systems for managing food stored in refrigerators have been developed (for example, see Japanese Unexamined Patent Application Publication No. 2014-085043 and Japanese Unexamined Patent Application Publication No. 2006-329597).

SUMMARY

In the related art, however, there is a problem that systems become very big and some kinds of items are difficult to manage.

The present disclosure provides a food management system that can manage various kinds of food with a simple configuration.

In order to solve the aforementioned problem, a food management system according to an aspect of the present disclosure is a food management system that manages food items in a refrigerator and includes: a pressure-sensitive sensor that acquires information including shapes, weights, and positions of the food items; a comparator that performs comparison of the information acquired at different times; and an identifier that identifies at least one of (i) fluctuations in a total number of food items or (ii) presence or absence of the food items.

According to the present disclosure, it is possible to mange various kinds of food items with a simple configuration.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a table illustrating an example of first food information stored in a memory of the food management system according to the embodiment;

Figure 1:
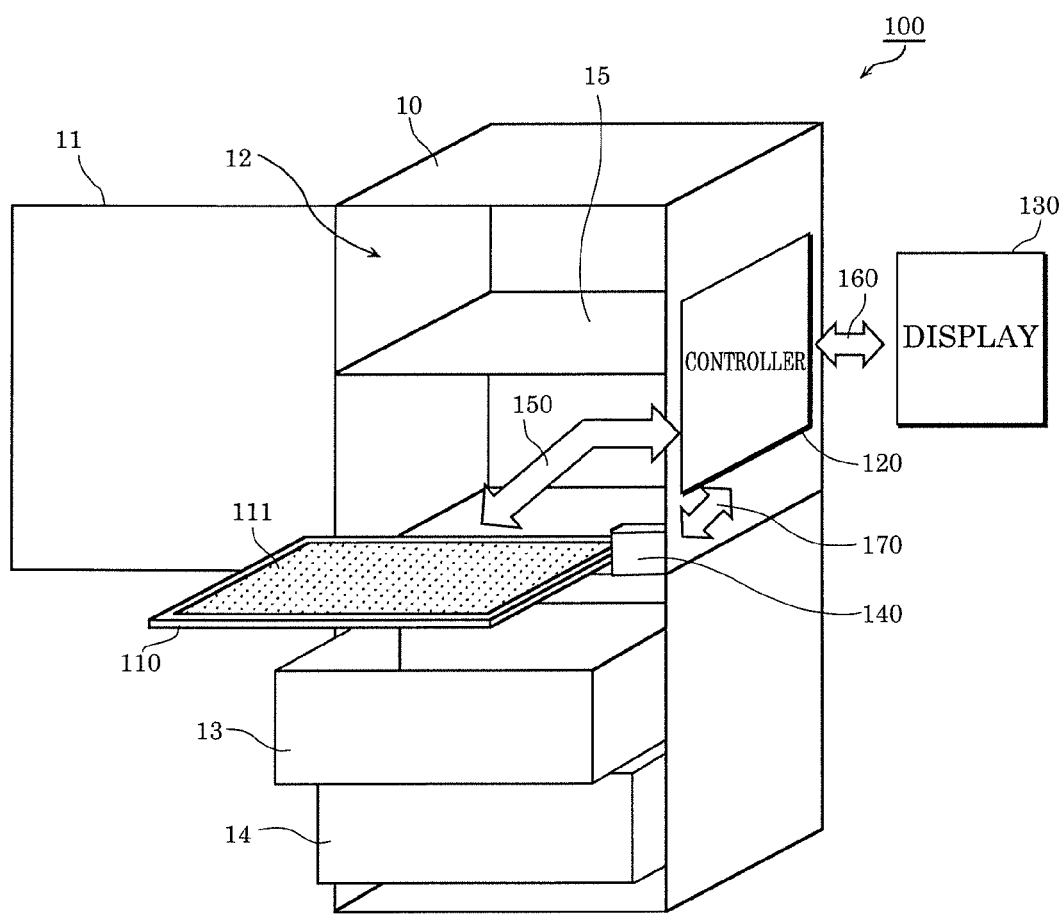
FIG. 1 is a diagram illustrating the configuration of a refrigerator including a food management system according to an embodiment.

DETAILED DESCRIPTION OF THE EMBODIMENT (Underlying Knowledge Forming the Basis of the Present Disclosure)

The inventors found that the following problems occur in the conventional management systems in "Description of the Related Art":

In a refrigerator-item management system described in Japanese Unexamined Patent Application Publication No. 2014-085043, a refrigerator communicates via a portable information terminal with a sales system introduced at a store, so that item information is acquired to manage items.

In the refrigerator item management system, however, the store requires a sales system capable of communicating with a portable information terminal of a purchaser of an item, leading to a very big system. Moreover, items purchased at a store not provided with the sales system cannot be managed.

In a refrigerator described in Japanese Unexamined Patent Application Publication No. 2006-329597, food items are managed by attaching wireless tags to the food items, the wireless tags containing food information. However, in the refrigerator described in Japanese Unexamined Patent Application Publication No. 2006-329597, it is necessary to attach wireless tags to items one-by-one. This requires the cooperation of manufacturers and distributors of items, leading to a very big system. Furthermore, the system cannot manage fresh food to which wireless tags are hard to attach.

In view of this, in order to solve the aforementioned problem, a food management system according to an aspect of the present disclosure is a food management system that manages food items in a refrigerator and includes: a pressure-sensitive sensor that acquires information including shapes, weights, and positions of the food items; a comparator that performs comparison of the information acquired at different times; and an identifier that identifies at least one of (i) fluctuations in the number of food items or (ii) presence or absence of the food items.

Thus, various kinds of food can be managed with a simple configuration.

A food management system according to an aspect of the present disclosure includes: a sensor that detects the shape and position of at least one food item placed in a detection area; and a controller, the controller including: a comparator that compares first food information on the shape and position of each food item detected by the sensor at a first time point and second food information on the shape and position of each food item detected by the sensor at a second time point subsequent to the first time point; a specifier that specifies a new food item that is absent in the detection area at the first time point and is present in the detection area at the second time point and a stored food item that is present in the detection area at the first time point and the second time point, based on the comparison result of the comparator; a counter that starts counting periods if at least one of the new food item or the stored food item is present in the detection area; and a calculator that calculates a placement period in the detection area for each food item specified by the specifier based on the periods counted by the counter.

Food items placed in the detection area are detected in this manner, eliminating the need for attaching wireless tags to the food items in advance. In other words, the food management system according to the aspect can manage fresh food to which wireless tags are hard to attach. Specifically, food items placeable in the detection area can be managed regardless of the kinds of food items. For example, if the detection area is set in a range on the shelf of the refrigerator, meals cooked using food materials by a user can be managed in addition to commercial food items such as fresh food, processed food, and beverages as long as the food items can be placed on the shelf of the refrigerator.

Furthermore, the use of the food detection results of the sensor eliminates the need for acquiring food information from the outside. Specifically, the sensor may be attached in a home refrigerator, achieving the food management system with a simple configuration.

Since periods are counted when at least one of a new food item or a stored food item is present in the detection area, the placement period of the food item in the detection area can be obtained. Thus, the food management system according to the aspect can manage various kinds of food with a simple configuration.

Furthermore, for example, the controller may further include a storage for storing the first food information.

This can store the food information detected by the sensor. Hence, the food management system according to the aspect can output (e.g., display) the food information anytime in response to, for example, a user request.

Furthermore, for example, the controller may further include an updater that updates the first food information stored in the storage, based on the specification result of the specifier.

Thus, placement periods stored in the storage can be continuously updated. Hence, the food management system according to the aspect can output (e.g., display) the food placement periods in response to, for example, a user request.

Furthermore, for example, the storage may store a placement period for each food item indicated in the first food information, the placement period being calculated by the calculator. The calculator may add periods counted by the counter to the placement period of each food item stored in the storage, thereby calculating the placement period of each food item specified by the specifier. The updater may update a placement period for each food item stored in the storage to the placement period calculated by the calculator.

Thus, even if multiple food items are placed in the detection area, the counter collectively counts the periods of the food items, thereby eliminating the need for counting placement periods for each of the food items. In other words, it is not necessary to prepare the counters according to the number of food items, achieving a simple configuration and a lower throughput. Moreover, the placement periods of multiple food items can be calculated regardless of the number of food items.

Furthermore, for example, the specifier may specify a food item to be deleted. The food item to be deleted is present in the detection area at the first time point and is absent in the detection area at the second time point. The updater may delete information corresponding to the food item to be deleted, from the first food information stored in the storage.

This can delete the information on the food item that is absent in the detection area from the storage, leading to the effective use of a memory resource.

Moreover, for example, the controller may further include a display controller having a user setting mode. In the user setting mode, a display is caused to display a setting screen that allows a user setting on whether the food item to be deleted and the new food item are identical to each other.

In the food management system according to the aspect, if a food item is collected from the detection area and then the collected food item is returned into the detection area, the collected food item may be specified as a food item to be deleted or the returned food item may be specified as a new food item, though the same food item is collected and returned. Thus, the setting screen is displayed and is shown to a user, allowing the user setting on whether the food item to be deleted and the new food item are identical to each other. Thus, the food management system according to the aspect can specify a food item under the support of a user without complicated processing. This can reduce a throughput and suppress power consumption for processing.

Moreover, for example, the setting screen includes a first map screen including a map of the positions and shapes of the food item to be deleted and the new food item and a first table screen including a table of the food item to be deleted and the new food item. The display controller may cause the display to display the first map screen and the first table screen in a switchable manner.

This can switch the map and the table (list), allowing the user to select an easily viewable display format. Hence, visibility can be improved for the user.

Moreover, for example, the controller may further include a setting receiver that receives a user setting indicating whether the food item to be deleted and the new food item are identical to each other. When the setting receiver receives a user setting that indicates that the food item to be deleted and the new food item are identical to each other, the updater may store, as the placement period of the new food item in the storage, the placement period of the food item to be deleted.

Thus, if the food item to be deleted and the new food item are identical to each other, the placement period of the food item to be deleted is replaced with the placement period of the new food item, so that the placement period can be continuously counted from the accumulated value of placement periods.

Furthermore, for example, the display controller may further have a period display mode in which a period display screen including the first food information stored in the storage and the placement period of each food item is displayed on the display so as to switch the user setting mode and the period display mode.

Thus, the placement period of each food item can be indicated to a user by displaying the period display screen.

Moreover, for example, the period display screen includes a second map screen including a map of the position and shape of the stored food item and a second table screen including a table of the corresponding placement period. The display controller may cause the display to display the second map screen and the second table screen in a switchable manner.

This can switch the map and the table (list), allowing the user to select an easily viewable display format. Hence, visibility can be improved for the user.

Furthermore, for example, the food management system according to an aspect of the present disclosure may further include the display.

Thus, the provision of the display can indicate the placement period to a user as the whole system.

Moreover, for example, the specifier may specify the new food item, the stored food item, and the food item to be deleted, based on an estimation model generated by machine learning.

This can improve the accuracy of specification of food items by using machine learning. Thus, a workload for the user setting can be reduced by improving the accuracy of specification of food items. In this way, the food management system according to the aspect can improve convenience for users.

Moreover, for example, the first food information and the second food information may include identification numbers for the respective food items.

Thus, the food items are managed with the allocated identification numbers, facilitating the management of the food items.

Furthermore, for example, the sensor may detect the weight of at least one food item placed in the detection area.

This can improve the accuracy of specification of food items by using the weights of the food items. Thus, a workload for the user setting can be reduced by improving the accuracy of specification of food items. In this way, the food management system according to the aspect can improve convenience for users.

Furthermore, for example, the sensor may be configured in the form of a sheet having the detection area on the top surface.

This can accurately detect the two-dimensional positions (e.g., two-dimensional coordinates) and the shapes (shapes in plan view) of food items.

Moreover, for example, the sensor may be disposed in a storage structure having an opening/closing door and may detect the shape and position of at least one food item placed in the detection area when the door is closed.

With this configuration, the door is opened or closed as a trigger of detection, thereby accurately counting storage periods in the refrigerator.

A food management method according to an aspect of the present disclosure includes: detecting the shape and position of at least one food item placed in a detection area; comparing first food information on the shape and position of each food item detected in the detecting at a first time point and second food information on the shape and position of each food item detected in the detecting at a second time point subsequent to the first time point; specifying a new food item that is absent in the detection area at the first time point and is present in the detection area at the second time point and a stored food item that is present in the detection area at the first time point and the second time point based on the comparison result of the comparing; counting periods if at least one of the new food item or the stored food item is present in the detection area; and calculating a placement period in the detection area for each of the new food item and the stored food item based on the periods counted in the counting.

Thus, various kinds of food can be managed with a simple configuration as in the food management system according to the aspect.

Hereinafter, exemplary embodiments will be described in detail with reference to the drawings.

Note that each of the subsequently described embodiments shows a generic or specific example of the present disclosure. The numerical values, shapes, materials, elements, the arrangement and connection of the elements, steps, the processing order of the steps, etc. shown in the following embodiments are mere examples, and thus are not intended to limit the present disclosure. Furthermore, among the elements described in the following embodiments, elements not recited in any one of the independent claims are described as optional elements.

Furthermore, the respective figures are schematic diagrams and are not necessarily precise illustrations. Therefore, for example, the scales, etc., in the respective figures are not necessarily uniform. Furthermore, in the respective figures, substantially identical components are assigned the same reference signs, and overlapping description is omitted or simplified.

Embodiment

[1. Outline]

Referring to FIG. 1, the outline of a food management system according to an embodiment will be first described below. FIG. 1 illustrates the configuration of refrigerator 10 including food management system 100 according to the present embodiment.

Refrigerator 10 is an example of a storage having opening/closing door 11. For example, refrigerator 10 is an ordinary home refrigerator. As illustrated in FIG. 1, refrigerator 10 includes storage part 12, to which door 11 is attached, and drawer storage parts 13 and 14.

Storage part 12 is a storage space kept at a low temperature of, for example, 1° C. to 5° C. Storage part 12 accommodates food and the like. Storage part 12 has shelf 15 that divides the storage space into two or more spaces. The storage space may be divided in a vertical or horizontal direction.

Storage part 13 is, for example, a freezer that is a storage space kept at 0° C. or lower, e.g., −18° C. to −22° C. Storage part 13 accommodates frozen food and the like. Storage part 13 may have an ice-making function. Storage part 14 is, for example, a vegetable compartment that is a storage space kept at 5° C. to 7° C. Storage part 14 accommodates vegetables and the like.

Food management system 100 according to the present embodiment manages food stored in refrigerator 10. Specifically, food management system 100 includes sensor 110 that is disposed in refrigerator 10 and manages a storage period during which food detected by sensor 110 is stored in refrigerator 10.

The storage period is an example of a period during which food is placed in detection area 111 of sensor 110 (i.e., a placement period). Specifically, the storage period is a period during which food is placed in detection area 111 and door 11 is closed. Food management system 100 manages a storage period for each food item if a plurality of food items are placed in detection area 111.

In FIG. 1, sensor 110 is placed in the lower compartment of storage part 12 but the configuration is not limited thereto. Sensor 110 may be placed in another compartment of storage part 12 or in storage part 13 or 14.

[2. Configuration]

Figure 2:
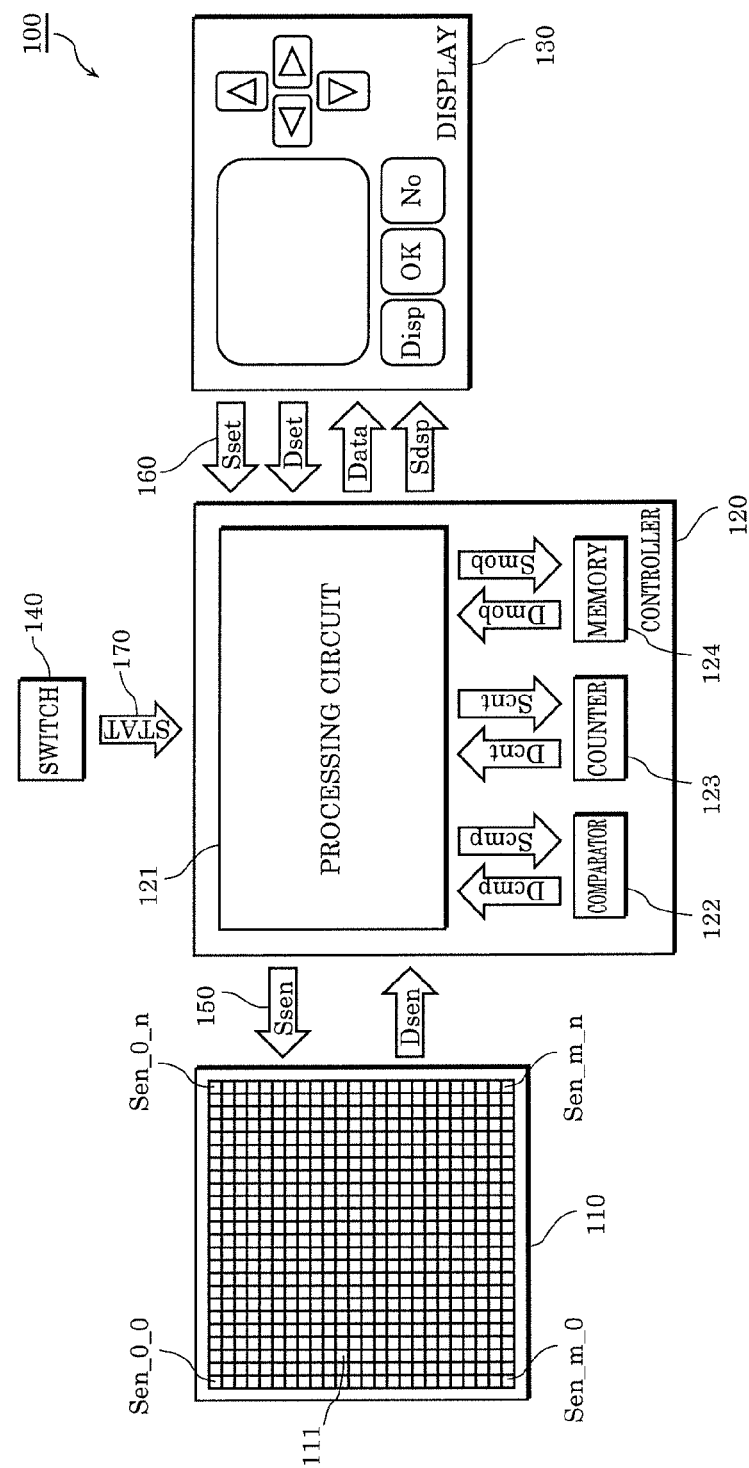
FIG. 2 is a diagram illustrating the configuration of the food management system according to the embodiment.

Referring to FIG. 1, the configuration of food management system 100 will be described below in accordance with FIG. 2. FIG. 2 illustrates the configuration of food management system 100 according to the present embodiment.

As illustrated in FIGS. 1 and 2, food management system 100 includes sensor 110, controller 120, display 130, switch 140, interfaces (IFs) 150, 160, and 170.

[2-1. Sensor]

Sensor 110 detects the shape and position of at least one food item placed in detection area 111. In the present embodiment, sensor 110 also detects the weight of at least one food item. Sensor 110 is, for example, a pressure-sensitive sensor that acquires information including the shapes, weights, and positions of food items.

Specifically, sensor 110 is configured in the form of a sheet having detection area 111 on the top surface as illustrated in FIG. 1. Sensor 110 is, for example, a flat sensor board and may be a flexible sensor sheet.

As illustrated in FIG. 2, sensor 110 includes a plurality of sensor elements Sen_0_0 to Sen_m_n disposed in an m×n array in detection area 111 on the top surface. Sensor elements Sen_0_0 to Sen_m_n are weight sensors or pressure-sensitive sensors, each detecting whether food is in contact with the sensor elements and detecting a pressure (correspond to a weight) received when the sensor elements are in contact with food. Sensor elements Sen_0_0 to Sen_m_n may be touch sensors, each detecting only whether food is in contact with the sensor element.

Sensor 110 detects the shape and position of a food item based on whether sensor elements Sen_0_0 to Sen_m_n are in contact with the food item. The shape of the food item is, for example, a shape in plan view when detection area 111 of sensor 110 is viewed from the front. The position of the food item is, for example, the position of the center of gravity of the food item when detection area 111 of sensor 110 is viewed from the front.

For example, if a food item circular in plan view is placed on detection area 111, the circular food item is placed over the multiple sensor elements. Some of sensor elements Sen_0_0 to Sen_m_n provided in detection area 111 are located in a circular range corresponding to the circular food item and are detected as the presence of the food item (that is, contact with the food item).

Thus, sensor 110 extracts the entire area of the sensor elements that have detected contact with the food item and detects the shape of the extracted entire area as the shape of the food item. The entire area is, for example, an area including the consecutive sensor elements from among all the sensor elements having detected contact with the food item. The entire area constitutes a closed area.

Furthermore, sensor 110 detects the position of the center of gravity of the entire area as the position of the food item. Moreover, sensor 110 detects the sum of weights detected by the sensor elements in the entire area as the weight of the food item. If multiple food items are placed in detection area 111, a plurality of entire areas are extracted. Thus, sensor 110 detects the number of entire areas as the number of food items.

As illustrated in FIGS. 1 and 2, sensor 110 is connected to controller 120 via IF 150. Specifically, sensor 110 transmits and receives information or signals to and from controller 120 via IF 150.

In this configuration, IF 150 is a communication interface that performs cable communications or radio communications. As illustrated in FIG. 2, IF 150 transmits sensing signal Ssen, which is outputted from controller 120, to sensor 110 and transmits detection result Dsen, which is generated by sensor 110, to controller 120.

Sensing signal Ssen is a signal indicating the timing of detection of a food item by sensor 110. Sensor 110 detects a food item when sensing signal Ssen is at high "1" level. Sensor 110 does not detect a food item when a signal level is at low "0" level.

Sensor 110 detects a food item placed in detection area 111 when a signal level of sensing signal Ssen outputted from controller 120 is, for example, at high level. Sensor 110 outputs detection result Dsen to controller 120. Sensor 110 may stop power supply to each sensor element during a period when a food item is not to be detected, thereby reducing power consumption.

Sensing signal Ssen is outputted from controller 120 based on status signal STAT outputted from switch 140. Status signal STAT indicates whether door 11 is opened or closed. Specifically, controller 120 outputs sensing signal Ssen when door 11 is closed based on status signal STAT. This allows sensor 110 to detect the shape, position, and weight of at least one food item placed in detection area 111 when door 11 is closed.

[2-2. Controller]

Controller 120 calculates the placement period of a food item placed in detection area 111. If a plurality of food items are place in detection area 111, controller 120 calculates a placement period for each of the food items.

Controller 120 is implemented by a microcomputer or the like. For example, controller 120 is implemented by non-volatile memory that stores programs, volatile memory serving as a temporary storage area for running the programs, an input/output port, and a processor for running the programs.

As illustrated in FIG. 2, controller 120 includes processing circuit 121, comparator 122, counter 123, and memory 124. The constituent elements of controller 120 will be specifically described below.

[2-2-1. Processing Circuit]

Processing circuit 121 is an information processing circuit for processing information (or signals) obtained from sensor 110, display 130, and switch 140. Processing circuit 121 is implemented by, for example, a processor. Processing circuit 121 is an example of an identifier that identifies at least one of fluctuations in the number of food items or the presence or absence of food items.

Figure 3:
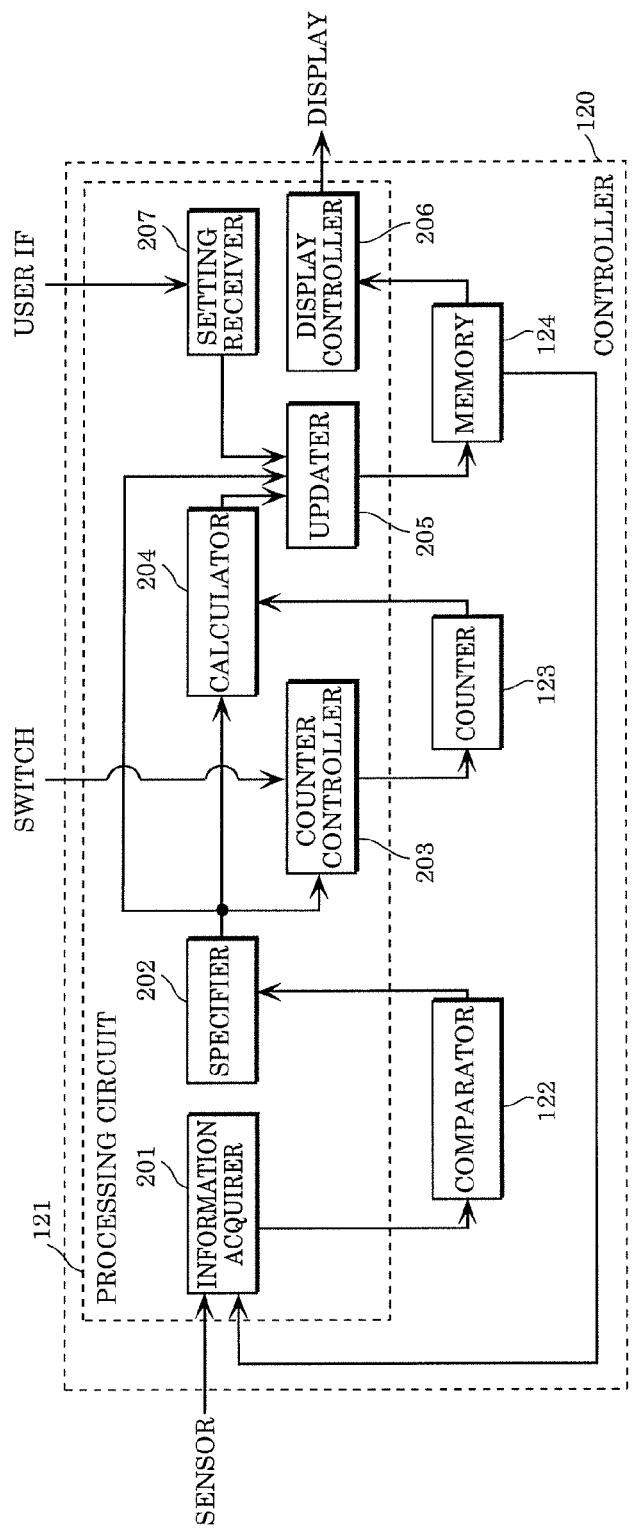
FIG. 3 is a block diagram illustrating the functional configuration of a controller of the food management system according to the embodiment.

FIG. 3 is a block diagram illustrating the functional configuration of controller 120 of food management system 100 according to the present embodiment. As illustrated in FIG. 3, processing circuit 121 includes information acquirer 201, specifier 202, counter controller 203, calculator 204, updater 205, display controller 206, and setting receiver 207. The detail of processing circuit 121 will be discussed later.

[2-2-2. Comparator]

Comparator 122 is an example of a comparator that compares food information. Specifically, comparator 122 compares food information at different times. For example, comparator 122 compares first food information on the shape, position, and weight of each food item detected by sensor 110 at a first time point and second food information on the shape, position, and weight of each food item detected by sensor 110 at a second time point subsequent to the first time point.

In the present embodiment, the first time point and the second time point are the timing of detection by sensor 110. Specifically, the first time point and the second time point are consecutive two time points of detection repeated by sensor 110. More specifically, the second time point is the timing of first detection and the first time point is the timing of detection performed immediately before latest detection.

Thus, the second food information indicates the state of the latest detection, that is, the present situation. The food information is based on detection result Dsen having been just outputted from sensor 110. The first food information indicates the state of detection prior to (immediately before) the latest detection. The first food information is food information Dmob stored in memory 124. Hereinafter, food items indicated by the second food information may be referred to as "current food items" and food items indicated by the first food information may be referred to as "former food items". The current food items include "new food item" and "stored food item". The former food items include "stored food item" and "food item to be deleted".

The new food item is not present in detection area 111 at the first time point (previous time point) and is present in detection area 111 at the second time point (current time point). The new food item is, for example, a food item newly stored in refrigerator 10.

The stored food item is present in detection area 111 at the first time point (previous time point) and the second time point (current time point). The stored food item is, for example, a food item kept in refrigerator 10.

The food item to be deleted is present in detection area 111 at the first time point (previous time point) and is not present in detection area 111 at the second time point (current time point). The food item to be deleted is, for example, a food item that is not returned to refrigerator 10 after being collected from refrigerator 10.

For example, comparator 122 determines the occurrence of matches of position, shape, and weight by comparing the position, shape, and weight of a former food item indicated by the first food information and the position, shape, and weight of a current food item indicated by the second food information.

If multiple former food items and multiple current food items are present, comparator 122 selects, for example, one of the current food items and compares the selected food item with the former food items, thereby determining the occurrence of matches of position, shape, and weight between the current food item and the former food items. Comparator 122 performs the comparison on all the current food items.

Comparator 122 performs the comparison based on comparison signal Scmp outputted from processing circuit 121. Comparison signal Scmp is, for example, a signal that provides an instruction to start comparison. Comparison signal Scmp may be data on the first food information and the second food information that are targets of comparison. Comparator 122 may compare the first food information and the second food information when receiving the data on the food information. Comparator 122 outputs comparison result Dcmp to processing circuit 121.

[2-2-3. Counter]

Counter 123 counts food placement periods. For example, the periods are counted in minutes or seconds. The unit of counting is not limited thereto.

Counter 123 starts counting periods when at least one of a new food item or a stored food item is present in detection area 111. Specifically, counter 123 starts counting periods when food is stored in refrigerator 10, that is, a current food item is present. In the absence of a current food item, counter 123 does not count periods, thereby suppressing power consumption.

In the present embodiment, counter 123 counts periods based on count signal Scnt outputted from processing circuit 121. Count signal Scnt is a signal indicating the timing for starting or finishing counting. For example, counter 123 starts counting when the signal level of count signal Scnt changes from low "0" to high "1" and counter 123 finishes counting when the signal level changes from high "1" to low "0". At the completion of counting, counter 123 outputs count data Dcnt to processing circuit 121. Count data Dcnt is data indicating count value Tcnt of counter 123.

Specifically, counter 123 starts and finishes counting under the control of counter controller 203 of controller 120. For example, if door 11 is closed and at least one of a new food item or a stored food item is present in detection area 111, the signal level of count signal Scnt changes from low to high, allowing counter 123 to start counting periods. If door 11 is opened, the signal level of count signal Scnt changes from high to low, allowing counter 123 to stop counting and output count data Dcnt to calculator 204.

[2-2-4. Memory]

Memory 124 is an example of a storage for storing the first food information. Memory 124 is implemented by, for example, a hard disk drive (HDD) or nonvolatile memory such as semiconductor memory. As illustrated in FIG. 4, memory 124 stores a placement period for each food item indicated in the first food information (that is, each former food item), the placement period being calculated by calculator 204.

FIG. 4 illustrates an example of the first food information stored in memory 124 of food management system 100 according to the present embodiment. As indicated in FIG. 4, a food identification number (serial number) is allocated to the position, shape, and weight of a food item (specifically, a stored food item) in the first food information. Furthermore, memory 124 stores a placement period for each food item.

In the example of FIG. 4, the position of a food item is expressed as the identification number (or the two-dimensional coordinates) of the sensor element corresponding to the center of gravity of the food item. The schematically illustrated shapes of food items may be expressed as text, e.g., "small circle", "large circle", and "rectangle". The weight of a food item is expressed as, for example, a specific numeric value. The weight may be expressed as binary flag information on weight levels including "heavy" and "light".

The food placement period is a placement period of a food item in detection area 111. In the present embodiment, the placement period is expressed as accumulated value $Cnt\_i$ of count value Tcnt of counter 123 where i is a natural number indicating an identification number.

Memory 124 reads and writes the first food information based on memory signal Smob outputted from processing circuit 121. Memory 124 outputs first food information Dmob to processing circuit 121.

[2-3. Display]

Figure 5:
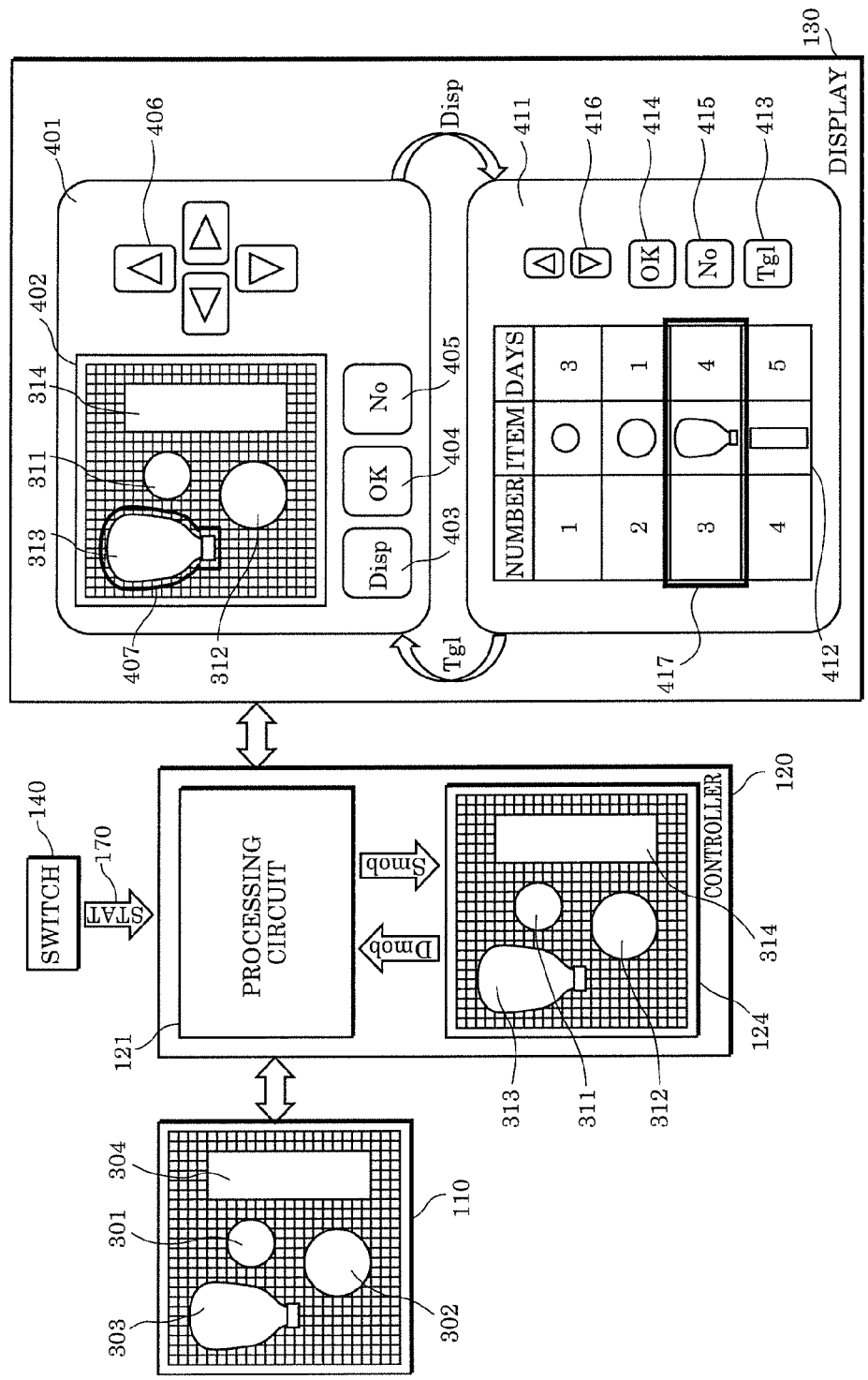
FIG. 5 is a diagram illustrating states of detected food items and a display example of a period display mode in the food management system according to the embodiment.
Figure 6:
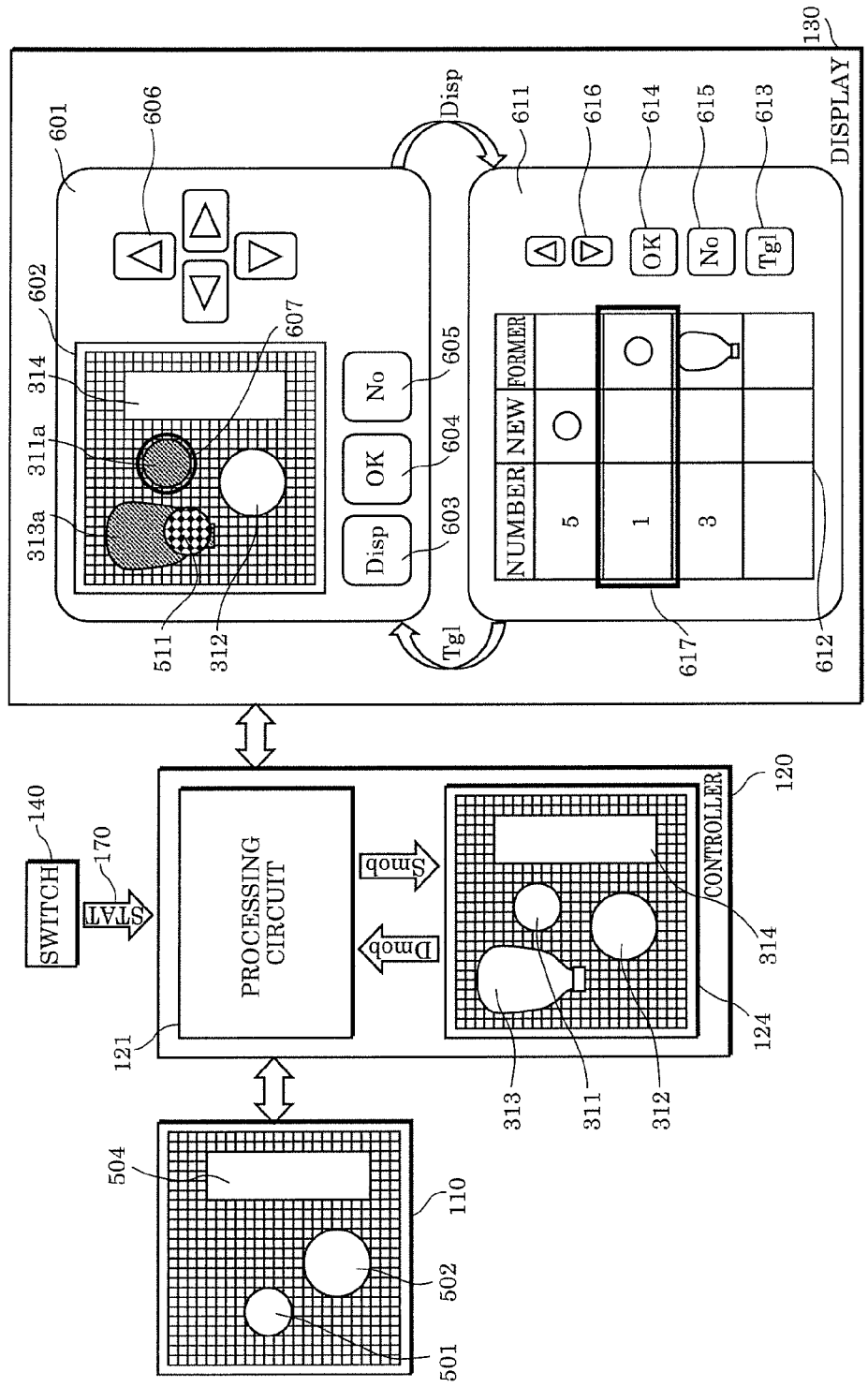
FIG. 6 is a diagram illustrating states of detected food items and a display example before a user setting is made in a user setting mode in the food management system according to the embodiment.
Figure 7:
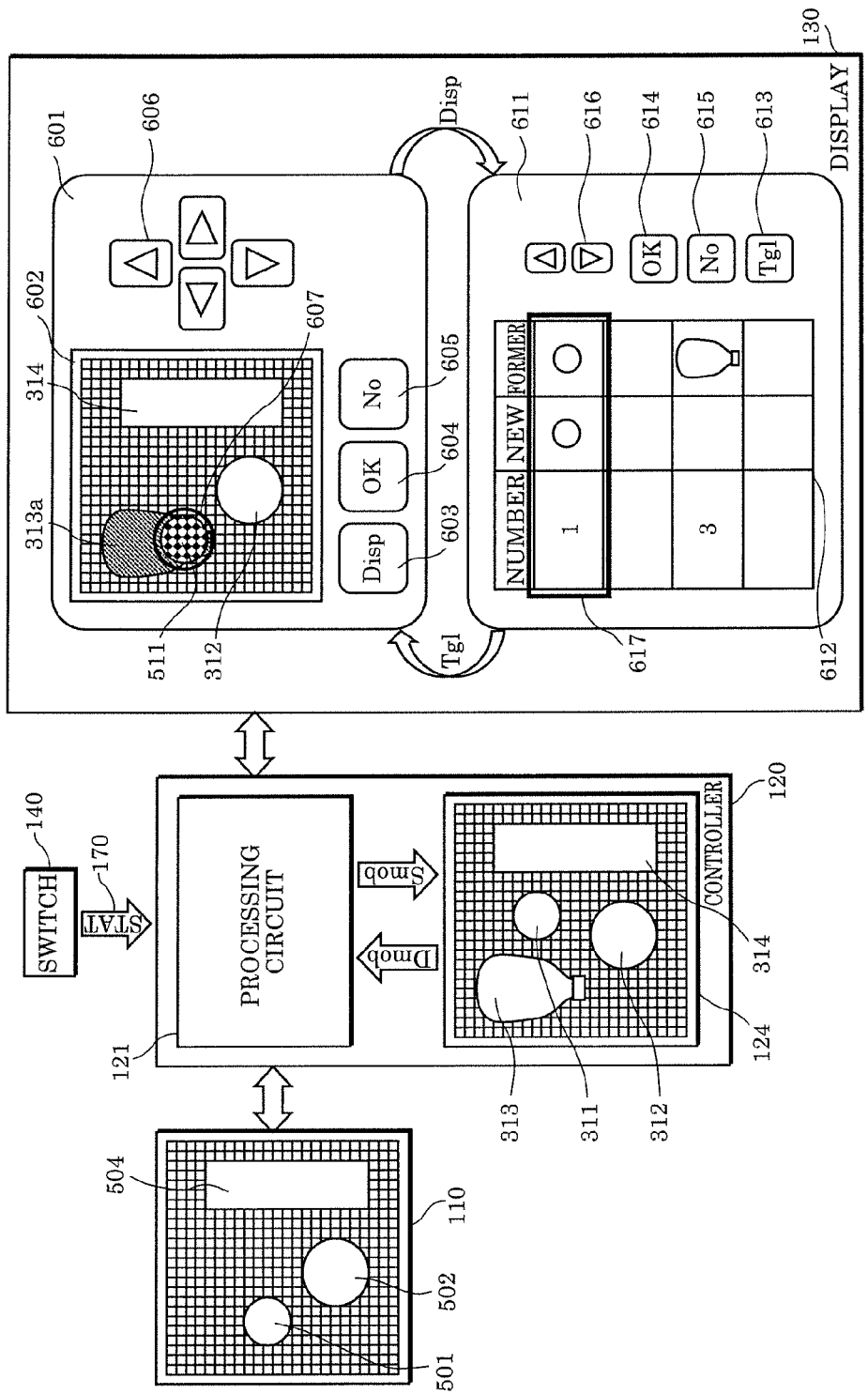
FIG. 7 is a diagram illustrating states of detected food items and a display example after a user setting is made in the user setting mode in the food management system according to the embodiment.

Display 130 is controlled by display controller 206 and displays a period display screen (see FIG. 5) and a setting screen (see FIGS. 6 and 7) or the like. Referring to FIGS. 5 to 7, the period display screen and the setting screen will be specifically described later.

Display 130 is, for example, a liquid crystal display (LCD) or an organic electroluminescent (EL) display and is not limited thereto. Display 130 is installed on, for example, the outer surface of refrigerator 10. Alternatively, display 130 may be the display of a portable information terminal, e.g., a smartphone or a mobile phone of a user.

As illustrated in FIGS. 1 and 2, display 130 is connected to controller 120 via IF 160. Specifically, display 130 transmits and receives information or signals to and from controller 120 via IF 160.

In this configuration, IF 160 is a communication interface that performs cable communications or radio communications. As illustrated in FIG. 2, IF 160 transmits display screen data Data and display signal Sdsp, which are outputted from controller 120, to display 130. Moreover, IF 160 transmits setting signal Sset and setting data Dset to controller 120. Setting signal Sset and setting data Dset indicate a user setting received by the touch sensor (user IF) of display 130.

Display signal Sdsp is a signal indicating the display timing of a user setting mode. Display 130 displays the setting screen of the user setting mode when the signal level of display signal Sdsp is at high "1" level. Display 130 does not display the setting screen when the signal level of display signal Sdsp is at low "0" level.

Setting signal Sset is a signal indicating the completion of a user setting. Controller 120 starts counting when the signal level of setting signal Sset is at high "1" level. Controller 120 does not start counting when the signal level is at low "0" level.

[2-4. Switch]

Switch 140 is turned on or off when door 11 of refrigerator 10 is opened or closed. In other words, switch 140 acts as an open/close sensor of door 11. For example, switch 140 is turned on when door 11 is closed, whereas switch 140 is turned off when door 11 is opened.

Switch 140 is, for example, a mechanical switch. An optical switch may be used instead. Switch 140 outputs status signal STAT to controller 120 via IF 170 according to an on/off state. Status signal STAT at high "1" level indicates that door 11 is opened. Status signal STAT at low "0" level indicates that door 11 is closed.

As illustrated in FIGS. 1 and 2, switch 140 is connected to controller 120 via IF 170. Specifically, switch 140 transmits and receives information or signals to and from controller 120 via IF 170.

IF 170 is a communication interface that performs cable communications or radio communications. As illustrated in FIG. 2, status signal STAT outputted from switch 140 is outputted to controller 120 by IF 170.

[3. Functional Configuration of the Processing Circuit]

Referring to FIG. 3, the functional configuration of processing circuit 121 will be described below.

[3-1. Information Acquirer]

Information acquirer 201 acquires food information indicating the position, shape, and weight of a food item. The food information may indicate at least the position and shape of a food item other than the weight of the food item.

Specifically, information acquirer 201 acquires the first food information stored in memory 124. Furthermore, information acquirer 201 acquires sensing signal Dsen outputted from sensor 110 and acquires the second food information from the acquired sensing signal Dsen.

[3-2. Specifier]

Specifier 202 is an example of a specifier that specifies a new food item, a stored food item, and a food item to be deleted based on the comparison result of comparator 122. Specifier 202 may specify only a new food item and a stored food item other than a food item to be deleted.

In the present embodiment, specifier 202 specifies whether a food item is a new item, a stored item, or an item to be deleted based on the positions, shapes, and weights of all food items indicated by the first food information or the second food information.

For example, specifier 202 determines that a former food item and a current food item are identical to each other if the position, shape, and weight of the former food item indicated by the first food information match the position, shape, and weight of the current food item indicated by the second food information, and then specifier 202 specifies the food item as a stored food item. In this case, matches may include differences of several % in addition to exact matches. Thus, even if a food item is slightly moved when other food items are stored or collected, the food item can be correctly specified as a stored food item.

When a stored food item is specified, matched weights may include a reduction during the use of the food item as well as exact matches and possible matches. For example, if a former food item and a current food item are identical in the position and shape and the current food item is lighter than the former food item, specifier 202 may specify the former food item and the current food item as a stored food item.

Moreover, if the second food information does not include a food item matching the position, shape, and weight of a food item indicated by the first food information, that is, a former food item is not present as a current food item, specifier 202 specifies the former food item as a food item to be deleted. Furthermore, if the first food information does not include a food item matching the position, shape, and weight of a food item indicated by the second food information, that is, a current food item is not present as a former food item, specifier 202 specifies the current food item as a new food item.

[3-3. Counter Controller]

Counter controller 203 controls counter 123. In the present embodiment, counter controller 203 controls the start and stop of counter 123 based on status signal STAT outputted from switch 140 and the specification result of specifier 202.

Specifically, if status signal STAT indicates that door 11 is closed and specifier 202 specifies at least one of a new food item or a stored food item, counter controller 203 starts counting by means of counter 123. If status signal STAT indicates that door 11 is opened, counter controller 203 stops counting by means of counter 123.

[3-4. Calculator]

Calculator 204 calculates the placement period of each food item specified by specifier 202 in detection area 111 based on periods counted by counter 123. Calculator 204 adds periods counted by counter 123 to the placement period of each food item stored in memory 124, thereby calculating the placement period of each food item specified by specifier 202. Specifically, calculator 204 calculates placement period $Cnt\_i$ of a food item with an identification number "i" based on expression (1) below:

$$Cnt\_i = Cnt\_i + Tcnt \quad (1)$$

where Tcnt is a count value of counter 123. In the present embodiment, Tcnt corresponds to a period during which door 11 is closed and opened. A specific example of calculation of the placement period will be described later with reference to FIG. 12.

[3-5. Updater]

Updater 205 updates the first food information stored in memory 124, based on the specification result of specifier 202. Specifically, updater 205 adds information on new food items to the first food information stored in memory 124. Updater 205 deletes information on food items to be deleted, from the first food information stored in memory 124. Moreover, updater 205 maintains information on stored food items in the first food information stored in memory 124.

Updater 205 is an example of an updater that updates the placement periods of food items. Furthermore, updater 205 updates the placement period of each food item stored in memory 124 to a placement period calculated by calculator 204. Specifically, updater 205 replaces the placement period of a stored food item with a placement period calculated by calculator 204.

When setting receiver 207 receives a user setting that indicates that a food item to be deleted and a new food item are identical to each other, updater 205 stores, as the placement period of the new food item in memory 124, the placement period of the food item to be deleted. Since the new food item is the former food item continuously placed in detection area 111, the placement period of the new food item can be calculated as a period continuing from the placement period of the food item to be deleted.

[3-6. Display Controller]

Display controller 206 controls display 130. In the present embodiment, display controller 206 has the user setting mode and a period display mode (or a normal mode). Display controller 206 can switch the user setting mode and the period display mode. Modes are switched based on, for example, a user operation.

In the user setting mode, display controller 206 causes display 130 to display a setting screen that allows a user setting on whether a food item to be deleted and a new food item are identical to each other. In the period display mode, display controller 206 causes display 130 to display a period display screen including the first food information stored in memory 124 and the placement period of each food item.

[3-7. Setting Receiver]

Setting receiver 207 is an example of a user setting device. Setting receiver 207 receives a setting made by a user (hereinafter, will be referred to as a user setting) to indicate whether a food item to be deleted and a new food item are identical to each other. Specifically, setting receiver 207 receives a user setting via a user IF. The user IF is, for example, a touch sensor provided on display 130.

For example, setting receiver 207 may receive user selection of food items displayed on display 130. Furthermore, setting receiver 207 may receive a setting for instructions to switch screens to be displayed on display 130 and switch display modes.

[4. Display Screen]

A screen example displayed on display 130 of food management system 100 according to the present embodiment will be described below. Different screens are displayed on display 130 in the period display mode (normal mode) and the user setting mode.

[4-1. Period Display Mode (Normal Mode)]

Referring to FIG. 5, a period display screen on display 130 in the period display mode will be described below. FIG. 5 illustrates the states of detected food items and a display example of the period display mode in food management system 100 according to the present embodiment.

In this example, as illustrated in FIG. 5, sensor 110 detects four food items 301 to 304 and food information on four food items 301 to 304 is stored in memory 124. For example, food items 301 to 304 have positions, shapes, and weights as indicated in FIG. 4.

In the period display mode, display controller 206 causes display 130 to display the period display screen. The period display screen includes map screen 401 and table screen 411. As illustrated in FIG. 5, display controller 206 causes display 130 to display map screen 401 and table screen 411 in a switchable manner.

Map screen 401 is an example of a second map screen including map 402 that illustrates the positions and shapes of stored food items. Map 402 is a two-dimensional image of the positions and shapes of food items 301 to 304. Map 402 includes food images 311 to 314 simulating the actual positions and shapes of food items 301 to 304 placed in detection area 111 of sensor 110.

Map screen 401 further includes display switching button 403, OK button 404, No button 405, cross key button 406, and cursor 407.

Display switching button 403 is a button for switching from map screen 401 to table screen 411. In response to a press (click or touch) to display switching button 403, display 130 displays table screen 411 instead of map screen 401.

OK button 404 is, for example, a button for determining the position of cursor 407. Alternatively, OK button 404 may be a button for terminating the display of map screen 401. No button 405 is a button for cancelling a user operation. For example, when No button 405 is pressed, the determined cursor 407 can be cancelled. Cross key button 406 is, for example, a button for moving cursor 407.

Cursor 407 indicates, for example, a food item selected on map 402. Cursor 407 moves vertically and horizontally on map 402 in response to an operation of cross key button 406. Moreover, cursor 407 may move for each food item included in map 402.

Table screen 411 is an example of a second table screen including table 412 that indicates stored food items and the respective placement periods. Table 412 includes identification numbers allocated to food items 301 to 304, visual information on food items 301 to 304 (in this table, the schematic outlines of the food items), and the placement periods. The placement periods are displayed as days of placement in detection area 111. The placement periods may be displayed in hours.

Table screen 411 further includes display switching button 413, OK button 414, No button 415, vertical key button 416, and cursor 417.

Display switching button 413 is a button for switching from table screen 411 to map screen 401. In response to a press to display switching button 413, display 130 displays map screen 401 instead of table screen 411.

OK button 414 is, for example, a button for determining the position of cursor 417. Alternatively, OK button 414 may be a button for terminating the display of table screen 411. No button 415 is a button for cancelling a user operation. For example, when No button 415 is pressed, the determined cursor 417 can be cancelled. Vertical key button 416 is, for example, a button for moving cursor 417.

Cursor 417 indicates, for example, a row selected on table 412. Cursor 417 moves vertically on the rows of table 412 in response to an operation of vertical key button 416.

Map screen 401 may also display the placement periods. For example, the placement periods may be illustrated so as to overlap the respective food items on map 402. Alternatively, selecting the food item by cursor 407 may pop up the placement period.

Map screen 401 and table screen 411 may be displayed at the same time (on one screen). For example, map screen 401 and table screen 411 may be displayed in picture-in-picture mode and display switching buttons 403 and 413 may be buttons for switching screens displayed on a main screen.

The period display mode is terminated when a user touches (or clicks) an area other than map 402, table 412, and the buttons on the period display screen. Alternatively, the mode may be terminated when OK button 404 or 414 is pressed and held (or double-clicked).

[4-2. User Setting Mode]

Referring to FIGS. 6 and 7, a user setting screen displayed on display 130 in the user setting mode will be described below.

FIG. 6 illustrates the states of detected food items and a display example before a user setting is made in the user setting mode in food management system 100 according to the present embodiment. FIG. 7 illustrates the states of detected food items and a display example after a user setting is made in the user setting mode in food management system 100 according to the present embodiment.

In this example, as illustrated in FIGS. 6 and 7, sensor 110 detects three food items 501, 502, and 504 and food information on four food items 301 to 304 is stored as a preceding state in memory 124. In FIGS. 6 and 7, food images 311 to 314 for four food items 301 to 304 are illustrated as a two-dimensional map on memory 124.

In the example illustrated in FIGS. 6 and 7, a user collects food items 301 and 303 and then returns food item 301 to a different position from the original position and does not return food item 303. For example, four food items 301 to 304 have positions, shapes, and weights as indicated in FIG. 4.

At this point, specifier 202 specifies food items 301 and 303 as food items to be deleted and specifies food item 501 as a new food item. Since food items 302 and 304 are food items 502 and 504, specifier 202 specifies food items 302 and 304 (i.e., food items 502 and 504) as stored food items.

In the user setting mode, display controller 206 causes display 130 to display the setting screen. The setting screen includes map screen 601 and table screen 611. As illustrated in FIGS. 6 and 7, display controller 206 causes display 130 to display map screen 601 and table screen 611 in a switchable manner.

Map screen 601 is an example of a first map screen including map 602 that illustrates the positions and shapes of food items to be deleted and new food items. Map 602 is an example of map information that illustrates the positions and shapes of new food items and food items to be deleted. In the example of FIG. 6, map 602 also illustrates stored food items. Map 602 includes food images 311a, 312, 313a, 314, and 511 simulating the actual positions and shapes of food items to be deleted, new food items, and stored food items.

In the present embodiment, food items to be deleted, new food items, and stored food items are displayed in different display modes. The display modes include colors, brightness, border lines, and changes over time (e.g., blinking or permanent display). For example, food images 311a and 313a indicating food items to be deleted are displayed in black, food image 511 indicating a new food item is colored, and food images 312 and 314 indicating stored food items are displayed in white.

Map screen 601 further includes display switching button 603, OK button 604, No button 605, cross key button 606, and cursor 607. Display switching button 603, OK button 604, No button 605, and cross key button 606 have the same functions as display switching button 403, OK button 404, No button 405, and cross key button 406 in FIG. 5.

Cursor 607 indicates, for example, a food item selected on map 602. Cursor 607 moves vertically and horizontally on map 602 in response to an operation of cross key button 606. Moreover, cursor 607 may move for each food item included in map 602.

If OK button 604 is pressed, cursor 607 is movable with a food item (food image) selected when OK button 604 is pressed. For example, if food image 311a is selected by cursor 607 as illustrated in FIG. 6, selected food image 311a can be vertically and horizontally moved by operating cross key button 606 after OK button 604 is pressed.

FIG. 7 illustrates selected food image 311a that is moved to overlap food image 511. This is the result of an operation of setting the food items as identical by a user because, for example, food item 301 (food item to be deleted) corresponding to food image 311a and food item 501 (new food item) corresponding to food image 511 are identical to each other.

Table screen 611 is an example of a first table screen including table 612 that indicates food items to be deleted and new food items. Table 612 is an example of list information that indicates new food items and food items to be deleted. Table 612 includes identification numbers allocated to food items to be deleted and new food items and visual information on food items (in this table, the outlines of the food items).

Table screen 611 further includes display switching button 613, OK button 614, No button 615, vertical key button 616, and cursor 617. Display switching button 613, OK button 614, No button 615, and vertical key button 616 have the same functions as display switching button 413, OK button 414, No button 415, and vertical key button 416 in FIG. 5.

Cursor 617 indicates a row selected on table 612. For example, cursor 617 moves vertically on the rows of table 612 in response to an operation of vertical key button 616. If OK button 614 is pressed, cursor 617 is movable with a row selected when OK button 614 is pressed. For example, if the second row "1" from the top is selected by cursor 617 as illustrated in FIG. 6, selected row can be vertically moved by operating vertical key button 616 after OK button 614 is pressed.

FIG. 7 illustrates the selected row that was moved to the first row. A circular icon for a food item to be deleted ("FORMER" in FIG. 7) was moved to the first row. This is the result of an operation of setting the food items as identical by a user because, for example, food item 301 (food item to be deleted) denoted as number "1" and food item 501 (new food item) denoted as number "5" are identical to each other.

The user setting mode is terminated when a user touches (or clicks) an area other than map 602, table 612, and the buttons on the setting screen. Alternatively, the mode may be terminated when OK button 604 or 614 is pressed and held (or double-clicked).

[5. Operation]

Referring to FIGS. 8 to 11, the operations of food management system 100 according to the present embodiment will be described below.

[5-1. Outline]

Figure 8:
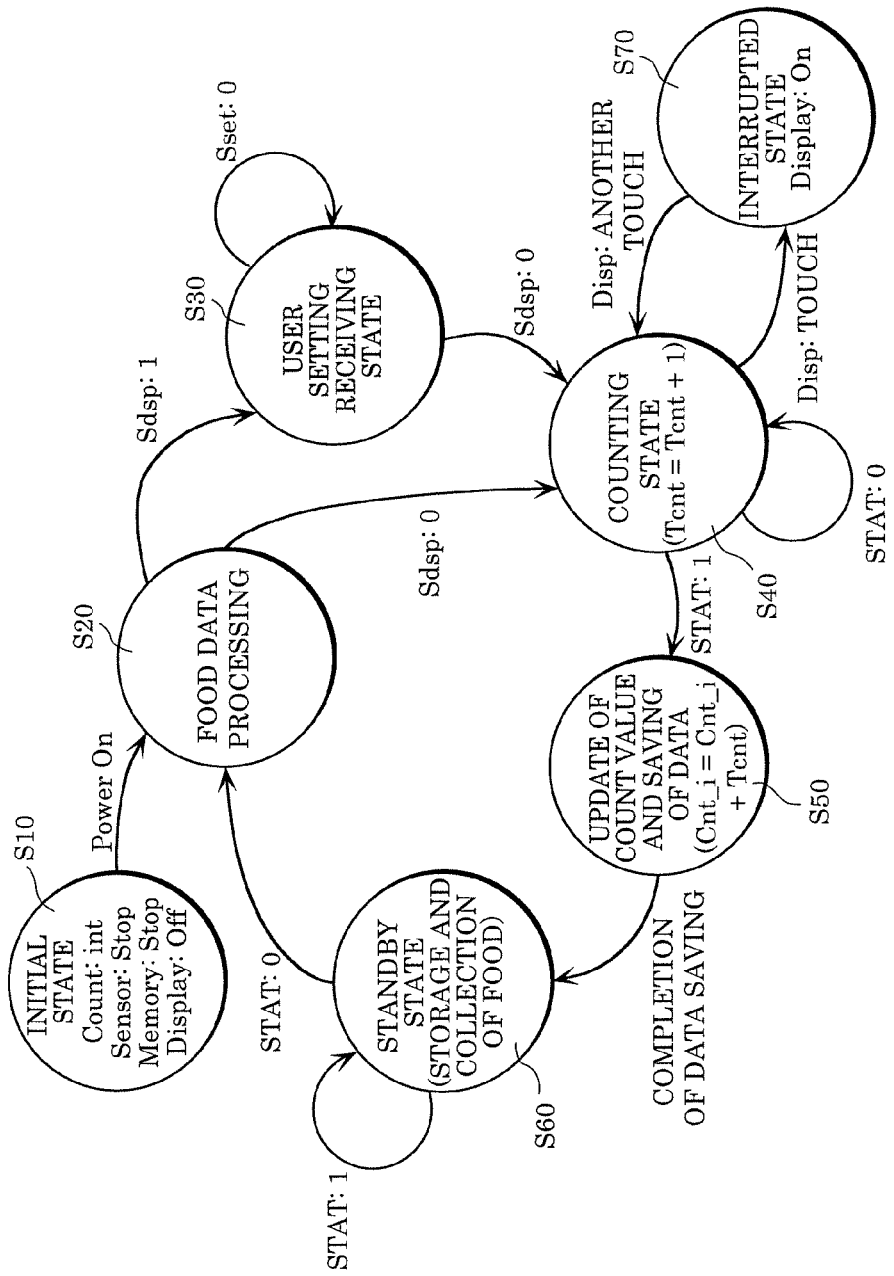
FIG. 8 is a state transition diagram indicating operations of the food management system according to the embodiment.

Referring to FIG. 8, an overall flow in food management system 100 will be first described below.

FIG. 8 is a state transition diagram indicating the operations of food management system 100 according to the present embodiment. As illustrated in FIG. 8, the operating state of food management system 100 starts from an initial state (S10) and makes a transition to food data processing (S20), a user setting receiving state (S30), a counting state (S40), an update of a count value and data saving (S50), a standby state for storage and collection of food (S60), and an interrupted state (S70).

The initial state (S10) is, for example, the state of food management system 100 when food management system 100 is introduced to refrigerator 10. Specifically, the initial state is a state where sensor 110 is disposed in refrigerator 10 and controller 120, display 130, and switch 140 are attached to refrigerator 10. In the initial state, count value Tcnt of counter 123 is set at an initial value (i.e., 0). Power supply to sensor 110, memory 124, and display 130 is stopped.

Power is supplied to the constituent elements of food management system 100, enabling food management system 100 to perform food data processing (S20). Specifically, food management system 100 detects the position, shape, and weight of at least one food item placed in latest detection area 111 when door 11 is closed. The detected information is then compared with the initial state or information on the positions, shapes, and weights of food items stored in memory 124. Subsequently, a new food item, a stored food item, and a food item to be deleted are specified based on the comparison result.

If at least one of a new food item or a food item to be deleted is specified in food data processing, that is, if a food item is changed in refrigerator 10 (Sdsp: 1), food management system 100 shifts to the user setting receiving state (S30). Specifically, food management system 100 displays the setting screen of FIG. 6 on display 130 and receives a user setting.

After the completion of the user setting or if food items are not changed in refrigerator 10 (Sdsp: 0), food management system 100 shifts to the counting state (S40). Specifically, in food management system 100, counter 123 starts counting and continues counting until door 11 is opened (STAT: 0).

When door 11 is opened (STAT: 1), a count value is added to a period stored in memory 124 and data is saved (S50). After completion of the data saving, a user stores or collects food items (S60). Food management system 100 stands by until the food items are stored or collected (STAT: 1). When the food items are stored or collected and door 11 is closed (STAT: 0), food management system 100 performs food data processing again.

In food management system 100, an interrupt may occur. Specifically, if a user touches display 130, food management system 100 handles an interrupt (S70). Typically, an interrupt is frequently handled when door 11 is closed, and thus FIG. 8 illustrates a transition from a counting state (S40) to an interrupted state. The transition is not limited thereto.

Interrupt handling is processing for confirming the placement period of a food item by a user. In the interrupt handing, the period display screen in FIG. 5 is displayed on display 130. When the user touches display 130 again, the interrupt handling is completed. Even if an interrupt occurs in a counting state, counting is continued.

[5-2. Food Data Processing]

Figure 9:
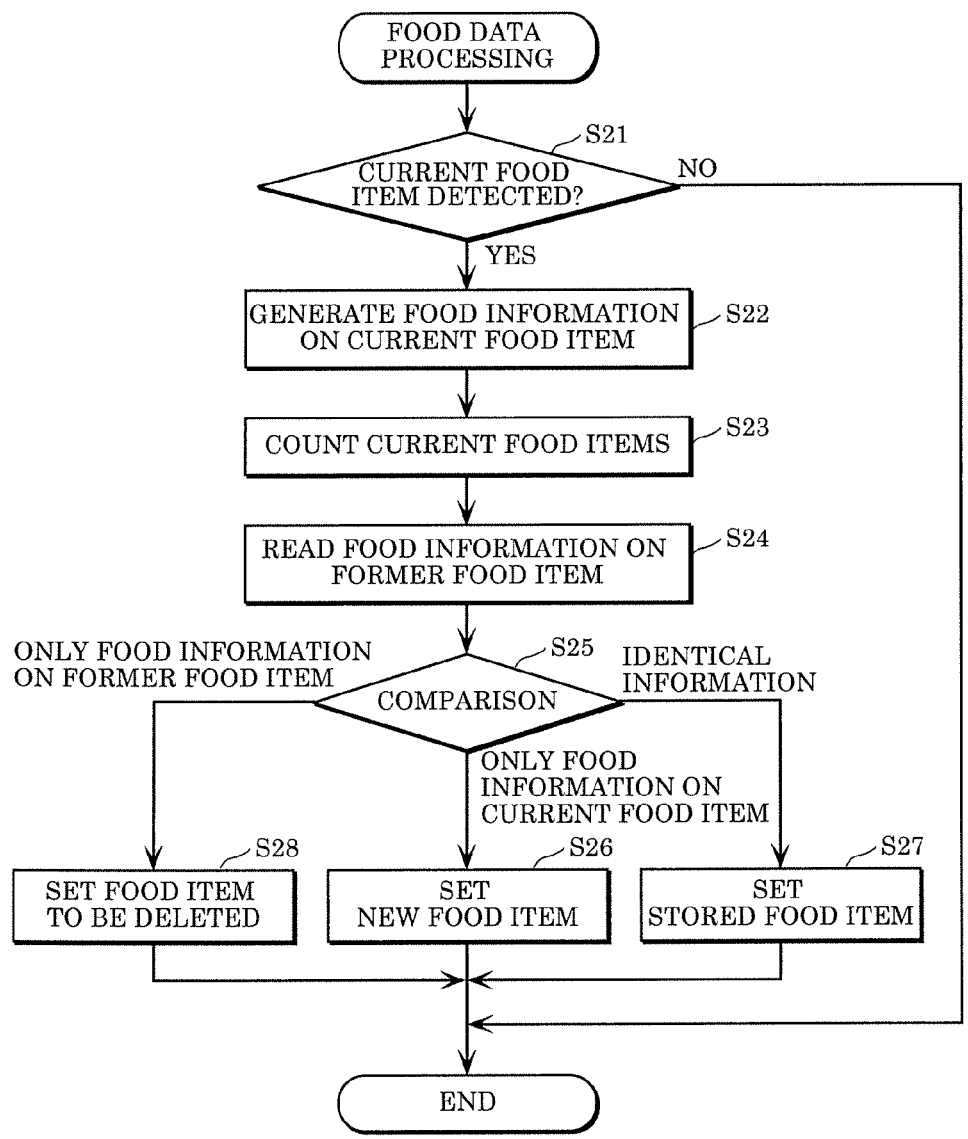
FIG. 9 is a flowchart of the details of food data processing in the food management system according to the embodiment.

Referring to FIG. 9, the detail of food data processing (S20) in FIG. 8 will be described below. FIG. 9 is a flowchart of the details of the food data processing (S20) in food management system 100 according to the present embodiment.

As indicated in FIG. 9, if a current food item is not detected by sensor 110 (No at S21), the food data processing is completed. In this case, counter 123 does not count periods and stands by until door 11 is opened and closed again.

If a current food item is detected by sensor 110 (Yes at S21), information acquirer 201 generates food information on the current food item (i.e., second food information) based on the detection result of sensor 110 (S22). Specifically, information acquirer 201 generates food information indicating the position, shape, and weight of each food item from the detection result.

In the example of FIG. 6, sensor 110 detects food items 501, 502, and 504 and thus information acquirer 201 acquires information indicating the positions, shapes, and weights of food items 501, 502, and 504.

Subsequently, information acquirer 201 counts the number of current food items (S23). The number of current food items is obtained by acquiring the shapes of food items based on the detection result of sensor 110. For example, the number of entire areas of the sensor elements in contact with food items is the number of current food items.

Subsequently, information acquirer 201 reads food information on former food items (i.e., first food information) from memory 124 (S24). For example, in the example of FIG. 6, information acquirer 201 acquires food information on food items 301 to 304 stored in memory 124.

Subsequently, comparator 122 compares the first food information and the second food information (S25). Specifically, comparator 122 determines whether current food items included in the second food information are included in the first food information.

If food information matching a current food item is not included in the first food information stored in memory 124, specifier 202 sets the current food item as a new food item (S26). If it is determined that a current food item is identical to a former food item, specifier 202 sets the current food item as a stored food item (S27). Moreover, specifier 202 sets former food items included in the first food information and not matching current food items, as food items to be deleted (S28).

Through the foregoing steps, food items included in the first food information and the second food information are categorized into new food items, stored food items, and food items to be deleted. In other words, new food items, stored food items, and food items to be deleted are specified. At this point, additional identification numbers are allocated to the new food items.

[5-3. User Setting]

Figure 10:
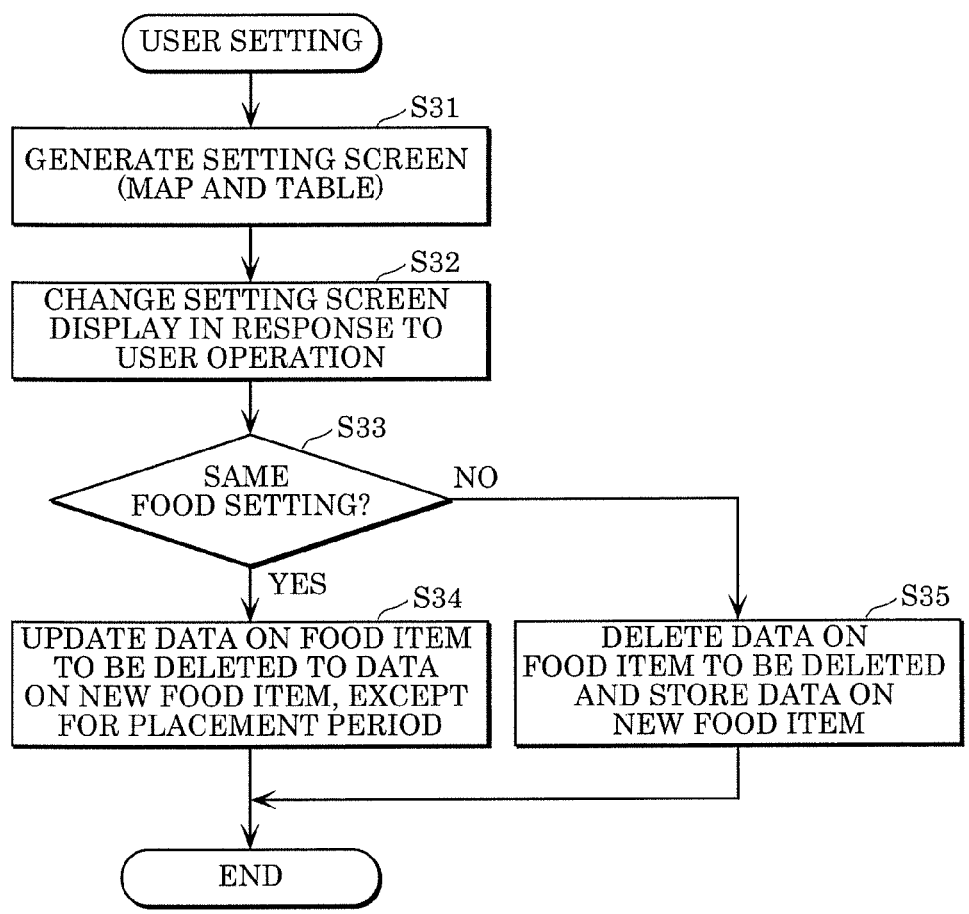
FIG. 10 is a flowchart of the details of user setting in the food management system according to the embodiment.

Referring to FIG. 10, the detail of user setting (S30) in FIG. 8 will be described below. FIG. 10 is a flowchart of the detail of the user setting (S30) in food management system 100 according to the present embodiment.

In the present embodiment, if a food item is collected from refrigerator 10 and then the collected food item is returned into refrigerator 10, the collected food item may be specified as a food item to be deleted or the returned food item may be specified as a new food item, though the same food item is collected and returned. The user setting allows a user to make a simple setting, so that the same food item as a food item to be deleted can be recognized from among new food items and the accuracy of management of periods can be improved.

First, display controller 206 generates a setting screen for the user setting and causes display 130 to display the setting screen (S31). For example, display controller 206 generates map screen 601 and table screen 611 that include new food items and food items to be deleted, and causes display 130 to display the screens. Display controller 206 may display any one of map screen 601 and table screen 611.

Subsequently, display controller 206 changes the display of the setting screen according to the user setting (S32). Specifically, setting receiver 207 receives the user setting in response to an operation of each button in map screen 601 or table screen 611, and display controller 206 moves cursor 607 or 617.

If the same food item is set (Yes at S33), updater 205 updates data other than placement periods to data on new food items (S34) among data on food items to be deleted. If the same food item is not set (No at S33), updater 205 deletes data on food items to be deleted and stores data on new food items (S35).

For example, in table screen 611 of FIG. 6, a food item to be deleted (former food item) as number "1" is identical to a new food item (current food item) as number "5". Thus, a user operates vertical key button 616 so as to move cursor 617 to the row of number "1" and then presses OK button 614 to select the row. After the selection, the user operates vertical key button 616 so as to move cursor 617 to the row of number "5" and then presses OK button 614 again. This processing corresponds to "Yes" of step S33 in FIG. 10.

Thus, table screen 611 in FIG. 6 is changed to table screen 611 in FIG. 7. Specifically, information on the second row is combined with the first row and then information on the second row is deleted. Moreover, numbers are updated so as to allocate the same number to a food item to be deleted and a new food item.

At this point, the placement period of the food item to be deleted is used as the placement period of the new food item. In other words, counting of the placement period of the new food item is started so as to be continued from the placement period of the food item to be deleted.

The operation on table screen 611 was described above. Map screen 601 is similarly operated. For example, in map screen 601 in FIG. 6, a user operates cross key button 606 so as to move cursor 607 to a position overlapping food image 311a and then presses OK button 604 to select the position. After the selection, the user operates cross key button 606 so as to move cursor 607 to a position overlapping food image 511 and then presses OK button 604 again. This processing corresponds to "Yes" of step S33 in FIG. 10.

Thus, map screen 601 in FIG. 6 is changed to map screen 601 in FIG. 7. Specifically, food image 311 is deleted.

At the completion of the user setting, food identification numbers stored in memory 124 may be reallocated. For example, in the case of deletion of data on food items to be deleted, identification numbers allocated to the food items to be deleted become unallocated. Reallocation eliminates unallocated numbers, achieving ease of management.

[5-4. Counting and Data Saving]

Figures 11, 12:
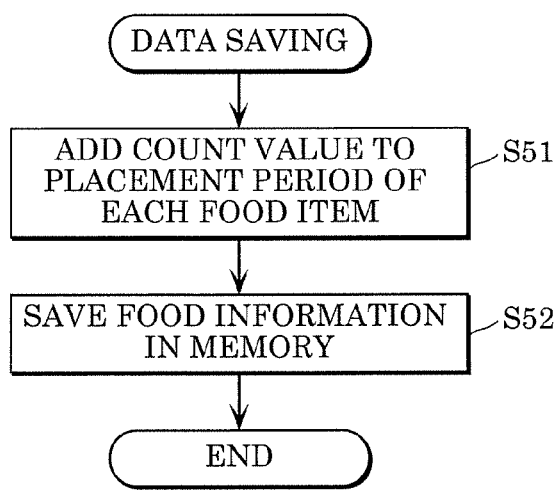
FIG. 11 is a table illustrating the counting in the food management system according to the embodiment.
FIG. 12 is a flowchart of data saving in the food management system according to the embodiment.

Referring to FIGS. 11 and 12, the detail of counting (S40) and data saving (S50) in FIG. 8 will be described below. FIG. 11 illustrates counting of food management system 100 according to the present embodiment. FIG. 12 is a flowchart of data saving in food management system 100 according to the present embodiment.

FIG. 11 indicates an example in which three food items A to C are present in detection area 111 and sensor 110 detects the food items. In an initial state, count value Tcnt of the counter is set at 0 and the placement periods of food items A to C are also set at 0.

As has been described in FIG. 8, when switch 140 detects that door 11 is closed, counter 123 starts counting. Counter 123 continues counting until door 11 is opened. Counting is terminated when door 11 is opened. For example, it is assumed that door 11 is closed and then is opened ten minutes later. At this point, count value Tcnt is ten minutes.

When door 11 is opened, data saving (S50) in FIG. 12 is performed. Specifically, calculator 204 adds count value Tcnt (=ten minutes) to the placement periods of food items A to C stored in memory 124 (S51). Thus, as indicated in FIG. 11, the placement periods of food items A to C are ten minutes.

Subsequently, processing circuit 121 saves food information and placement periods, which are temporarily stored in an arithmetic work area, in memory 124 (S52). Counter 123 resets the count value to an initial value of 0.

At this point, a user adds food item D. Food item D is a new food item and thus the placement period is 0 in an initial state. Thereafter, counter 123 similarly starts counting when door 11 is closed, and counting is terminated when door 11 is opened. For example, it is assumed that door 11 is closed and then is opened five minutes later. At this point, count value Tcnt is five minutes.

When door 11 is opened, calculator 204 adds count value Tcnt (=five minutes) to the placement periods (accumulated count value Cnt_i) of food items A to D stored in memory 124. Thus, the placement periods of food items A to C are 15 minutes and the placement period of food item D is five minutes.

In this way, single counter 123 can count the placement periods of multiple food items. Counter 123 collectively counts the periods of multiple food items, thereby eliminating the need for counting placement periods for each of the food items. In other words, it is not necessary to prepare counters 123 according to the number of food items, achieving a simple configuration and a lower throughput. Moreover, the placement periods of multiple food items can be calculated regardless of the number of food items.

[6. Summary]

As described above, food management system 100 according to the present embodiment includes sensor 110 that detects the shape and position of at least one food item placed in detection area 111 and controller 120. Controller 120 includes comparator 122 that compares the first food information on the shape and position of each food item detected by sensor 110 at the first time point and the second food information on the shape and position of each food item detected by sensor 110 at the second time point subsequent to the first time point, specifier 202 that specifies a new food item and a stored food item based on the comparison result of comparator 122, counter 123 that starts counting periods if at least one of a new food item or a stored food item is present in detection area 111, and calculator 204 that calculates a placement period in detection area 111 for each food item specified by specifier 202 based on periods counted by counter 123.

Food items placed in detection area 111 are detected in this manner, eliminating the need for attaching wireless tags to the food items in advance. In other words, food management system 100 according to the present embodiment can manage fresh food such as vegetables to which wireless tags are hard to attach. Furthermore, the use of the food detection results of sensor 110 eliminates the need for acquiring food information from the outside. Specifically, sensor 110 may be attached in home refrigerator 10, achieving food management system 100 with a simple configuration.

Since periods are counted when at least one of a new food item or a stored food item is present in detection area 111, the placement period of the food item in detection area 111 can be obtained. Thus, food management system 100 according to the present embodiment can manage various kinds of food with a simple configuration.

(Variation)

Figure 13:
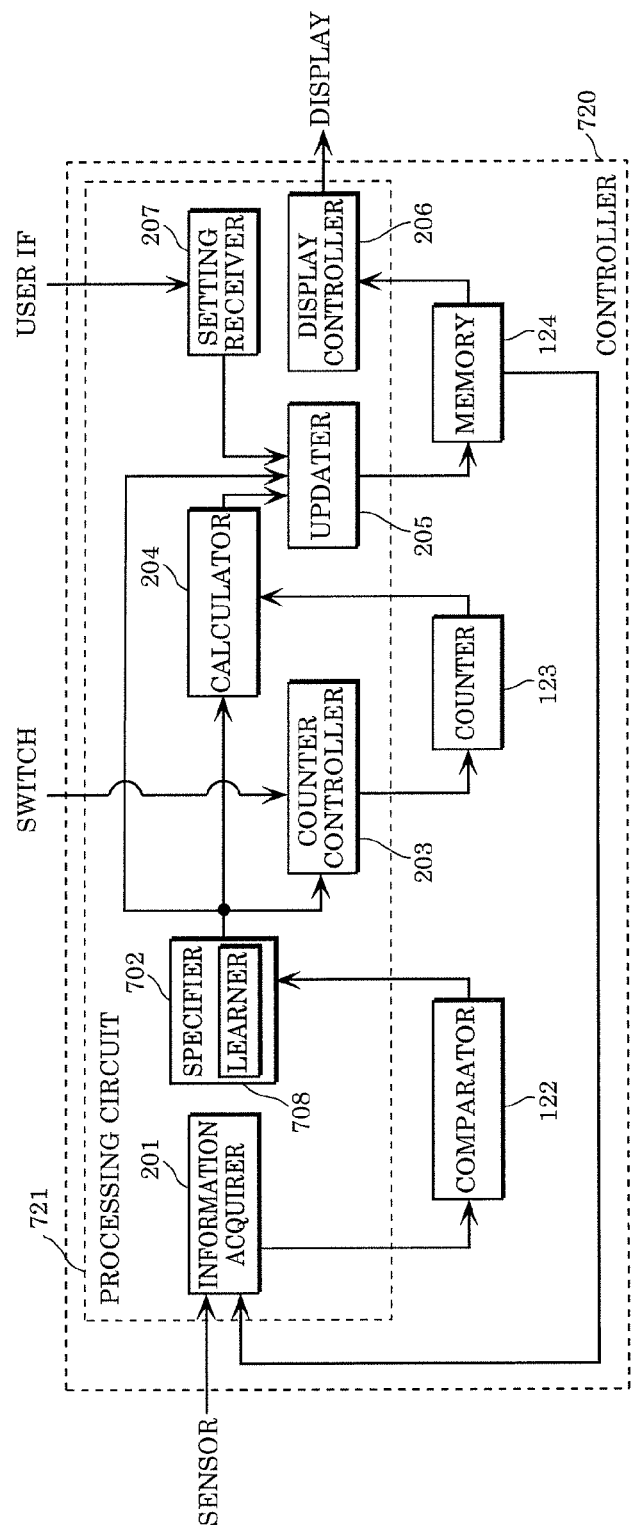
FIG. 13 is a block diagram illustrating the functional configuration of a controller of a food management system according to a variation of the embodiment.
Figure 14:
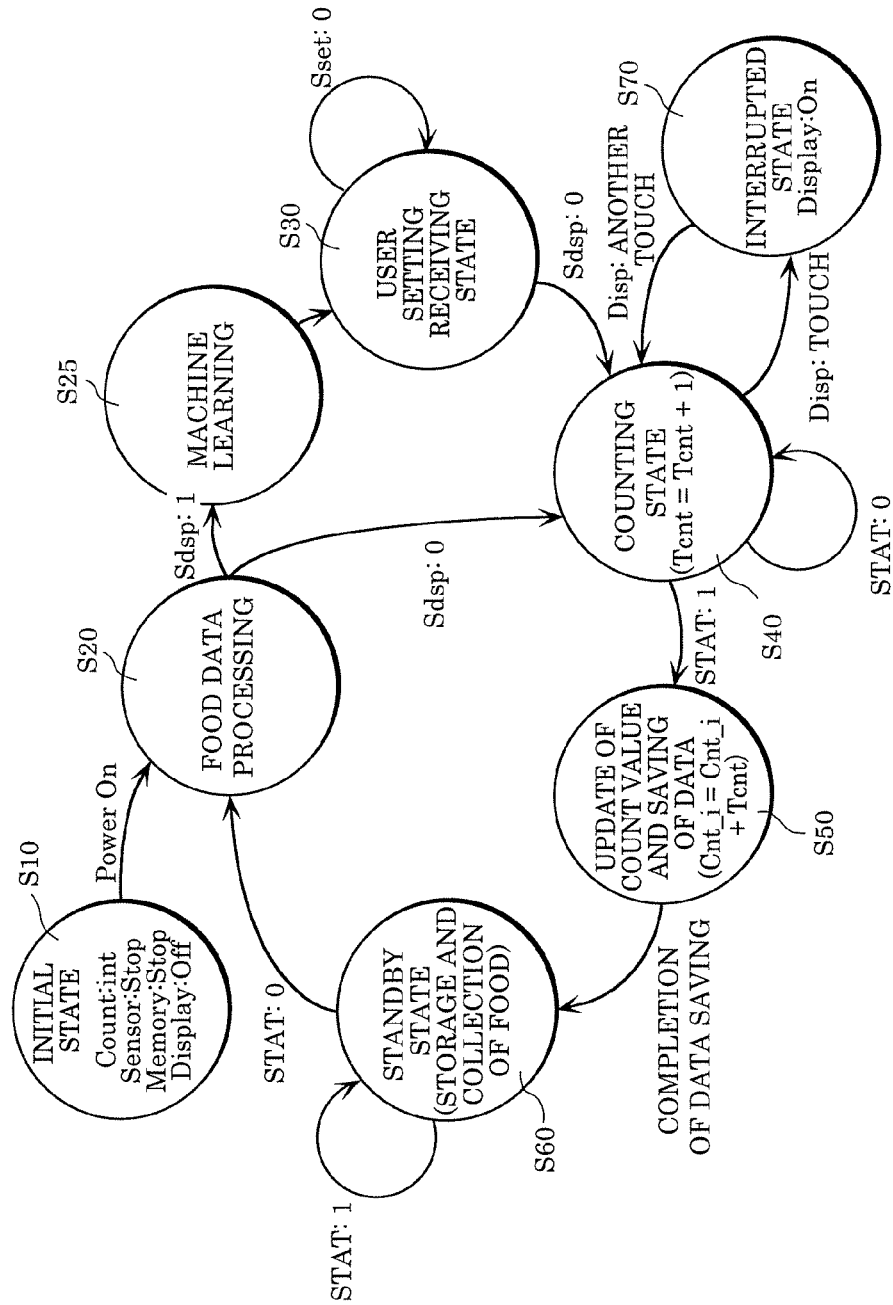
FIG. 14 is a state transition diagram indicating operations of the food management system according to the variation.

Referring to FIGS. 13 and 14, a variation of a food management system according to the present embodiment will be described below.

Referring to FIG. 13, the configuration of the food management system according to the variation will be described below. FIG. 13 is a block diagram illustrating the functional configuration of controller 720 of the food management system according to the variation.

The food management system according to the variation includes controller 720 in FIG. 13 instead of controller 120 of the embodiment. Controller 720 includes processing circuit 721. Processing circuit 721 is different from processing circuit 121 in FIG. 3 in that specifier 702 is provided instead of specifier 202. Hereinafter, differences from the embodiment will be mainly discussed and the explanation of common points is omitted or simplified.

Specifier 702 according to the variation specifies a new food item, a stored food item, and a food item to be deleted, based on an estimation model generated by machine learning. Specifically, specifier 702 includes learner 708 as illustrated in FIG. 13.

Learner 708 generates the estimation model based on, for example, an algorithm of machine learning such as supervised learning. Learner 708 receives, as feedback, the result of a user setting received by setting receiver 207, thereby learning a food specification result with an inputted comparative result.

FIG. 14 is a state transition diagram indicating the operations of the food management system according to the variation. The present variation is different from the state transition diagram in FIG. 8 according to the embodiment in that machine learning (S25) is added between food data processing (S20) and user setting (S30) as indicated in FIG. 14.

This increases the accuracy of food specification results obtained by specifier 702, so that a user setting is not necessary in many cases. Thus, the food management system according to the variation can improve convenience for users.

Another Embodiment

The food management system and the food management method according to at least one aspect was described above based on the embodiment. The present disclosure is not limited to the embodiment. Without departing from the scope of the present disclosure, various modifications may be made for the present embodiment by a person skilled in the art or the constituent elements of a different embodiment may be combined as an embodiment within the scope of the present disclosure.

For example, sensor 110 need not detect the weight of a food item. Sensor 110 may be a noncontact food sensor, e.g., a camera (image sensor) for shooting of a storage space in refrigerator 10 or an infrared sensor. Sensor 110 may detect the three-dimensional shape and three-dimensional position of a food item.

Alternatively, for example, the sensor, the controller, and the display may be integrated into a single unit. Specifically, the food management system may be implemented as a food management apparatus including a sensor, a controller, and a display that are stored or held in a single housing. The display and the controller may be provided on, for example, the edge of the detection area of a board-like sensor. Alternatively, the controller and the detection area of the sensor may be provided on opposite sides. Thus, food items can be managed only by disposing the food management apparatus in a storage structure without wiring for connecting the controller and the display.

Alternatively, for example, the food management system allows a comparison not only with previous food information but also with food information several times before the previous food information. Thus, for example, if the door is opened to collect a food item, the door is closed without returning the food item, the door is opened again to return the food item, and then the door is closed, the food item can be specified as a stored food item.

For example, the food management system need not include the display. The food management system may include, for example, a speaker that outputs information on a placement period for each food item as voice data.

Alternatively, for example, the food management system need not include the storage. The food management system may use, as the storage, for example, an external memory (e.g., USB memory) that is detachably attached to the controller or sensor, or to a storage structure to which the food management system is applied.

For example, the food management system may be applied to a storage structure other than a refrigerator. For example, the food management system may be applied to a storage structure having a temperature controlling function that can keep a constant temperature such as room temperature without cooling food items. Alternatively, the food management system may be applied to a storage box that does not have a temperature regulating function.

Alternatively, for example, the food management system may be implemented as an article management system that manages articles other than food. The article management system may control, for example, the inventory of articles.

Furthermore, the communication method between devices described in the foregoing exemplary embodiments is not particularly limited. When wireless communication is performed between devices, the wireless communication method (communication standard) is, for example, short-range communication such as ZigBee (registered trademark), Bluetooth (registered trademark), or wireless local area network (LAN). Alternatively, the wireless communication method (communication standard) may be communication via a wide-area communication network such as the Internet. Furthermore, wire communication may be performed between devices instead of wireless communication. Wire communication is, specifically, communication using power line communication (PLC), wired LAN, etc.

Furthermore, in the foregoing exemplary embodiments, processes executed by a specific processing unit may be executed by another processing unit. Moreover, the order of processes may be changed or processes may be executed in parallel. Furthermore, the way the elements included in the food management system is allocated to devices is one example. For example, the elements included in one device may be included in another device. Furthermore, the food management system may be implemented as a single device.

For example, the processes described in the foregoing exemplary embodiments may be implemented by centralized processing using a single device (system), or may be implemented by decentralized processing using a plurality of devices. Furthermore, the processor executing the aforementioned program may comprise one processor or a plurality of processors. In other words, centralized processing or decentralized processing may be performed.

Furthermore, in the foregoing exemplary embodiments, all of the elements such as the controller may be configured using dedicated hardware, or may be implemented by executing software programs suitable for the respective elements. Each of the elements may be implemented by a program executing component, such as a central processing unit (CPU) or processor, reading and executing a software program recorded on a recording medium such as a hard disk drive (HDD) or a semiconductor memory.

Furthermore, elements such as the controller may be configured using one or more electronic circuits. The one or more electronic circuits may each be a general-purpose circuit or a dedicated circuit.

The one or more electronic circuits may include, for example, a semiconductor device, an integrated circuit (IC), or a large-scale integration (LSI). The IC or LSI may be integrated in a single chip or several chips. Although referred to here as IC or LSI, the name may change depending on the scale of integration, and may be referred to as a system LSI, very large scale integration (VLSI), or ultra large scale integration (ULSI). Furthermore, a field programmable gate array (FPGA) that can be programmed after being manufactured may be used for the same purpose.

Furthermore, general or specific aspects of the present disclosure may be implemented as a system, an apparatus, a method, an integrated circuit, a computer program, or a non-transitory computer-readable recording medium such as an optical disc, an HDD, or a semiconductor memory on which the computer program is recorded, or may be implemented as any combination of a system, an apparatus, a method, an integrated circuit, a computer program, and a recording medium.

Furthermore, various modifications, replacement, addition, and omission may be carried out on each of the foregoing exemplary embodiments within the scope of the claims or its equivalents.

INDUSTRIAL APPLICABILITY

The present disclosure is usable as, for example, a food management system that can manage food items with a simple configuration. The present disclosure may be used for, for example, a home refrigerator or a storage box.

What is claimed is:

1. A food management system that manages food items in a refrigerator, the food management system comprising:
    a pressure-sensitive sensor that acquires information including shapes, weights, and positions of the food items; and
    a control circuit configured to function as:
        a comparator that performs comparison of the information acquired at different times; and
        an identifier that identifies at least one of (i) fluctuations in a total number of food items or (ii) presence or absence of the food items.
2. The food management system according to claim 1, wherein the identifier functions as a specifier that specifies a new food item, a stored food item, and a food item to be deleted based on a result of the comparison.
3. The food management system according to claim 2, wherein the identifier further functions as a user setting receiver.
4. The food management system according to claim 3, wherein
    the user setting receiver receives selection of food item.
5. The food management system according to claim 4, further comprising:
    a display, wherein
    if the user setting receiver is used by the user, the display displays one of
        map information illustrating positions and shapes of the new food item and the food item to be deleted; and
        list information indicating the new food item and the food item to be deleted.
6. The food management system according to claim 5, wherein
    the display switches between displaying the map information and displaying the list information.
7. The food management system according to claim 2, wherein
    the control circuit is further configured to function as an updater that updates a placement period of a food item, and
    if the new food item and the food item to be deleted are identical to each other, the updater updates a placement period of the food item to be deleted to a placement period of the new food item.
8. The food management system according to claim 2, wherein
    the specifier specifies the new food item, the stored food item, and the food item to be deleted, based on an estimation model generated by machine learning.
9. The food management system according to claim 1, further comprising:
    a display that displays placement periods of the food items and/or the information on the food items.
10. The food management system according to claim 1, wherein
    the information includes identification numbers respectively associated with the food items.
11. The food management system according to claim 1, wherein
    the pressure-sensitive sensor is configured in a form of a sheet having a detection area on a top surface.
12. The food management system according to claim 1, wherein
    the pressure-sensitive sensor is disposed in a storage structure having an opening/closing door, and acquires the information when the door is closed.
13. A food management system that manages food items in a refrigerator, the food management system comprising:
    a pressure-sensitive sensor that acquires information including shapes, weights, and positions of the food items; and
    a controller including a processor and a recording medium storing a program,
    wherein the program, when executed by the processor, causes the controller to:
        generate food item information based on the information acquired by the pressure-sensitive sensor;
        perform comparison of the information acquired at different times; and identify at least one of (i) fluctuations in a total number of food items or (ii) presence or absence of the food items.

14. The food management system according to claim 13, wherein
the executed program further causes the controller to specify a new food item, a stored food item, and a food item to be deleted from the food item information based on a result of the comparison.

15. The food management system according to claim 14, further comprising a user interface that receives a user input from a user,
wherein the executed program further causes the controller to determine whether the new food item and the food item to be deleted from the food item information are identical based on the user input.

16. The food management system according to claim 15, further comprising:
a display, wherein
the executed program further causes the controller to cause the display to display one of:
map information illustrating positions and shapes of the new food item and the food item to be deleted from the food item information; and
list information indicating the new food item and the food item to be deleted from the food item information.

17. The food management system according to claim 14, wherein the executed program further causes the controller to:
update a placement period of a food item, and
if the new food item and the food item to be deleted from the food item information are identical to each other, update a placement period of the food item to be deleted from the food item information to a placement period of the new food item.

18. The food management system according to claim 14, wherein
the executed program further causes the controller to specify the new food item, the stored food item, and the food item to be deleted from the food item information, based on an estimation model generated by machine learning.

* * * * *